(12) United States Patent
Sardo

(10) Patent No.: US 8,672,235 B2
(45) Date of Patent: Mar. 18, 2014

(54) DEVICE AND METHOD FOR THE THERMAL FOGGING OF A LIQUID

(75) Inventor: Alberto Sardo, Chateaurenard (FR)

(73) Assignee: Xeda International, Saint Andiol (FR)

( * ) Notice: Subject to any disclaimer, the term of this patent is extended or adjusted under 35 U.S.C. 154(b) by 991 days.

(21) Appl. No.: 12/591,326

(22) Filed: Nov. 17, 2009

(65) Prior Publication Data

US 2010/0123018 A1   May 20, 2010

(30) Foreign Application Priority Data

Nov. 18, 2008  (FR) ..................................... 08 57830

(51) Int. Cl.
  *B05B 1/24*   (2006.01)
  *B05C 1/00*   (2006.01)
(52) U.S. Cl.
  USPC ............. 239/136; 239/137; 239/74; 137/113; 137/114; 47/57.7
(58) Field of Classification Search
  USPC .................... 239/74, 136, 137; 137/113, 114; 427/446; 47/57.7
  See application file for complete search history.

(56) References Cited

U.S. PATENT DOCUMENTS

| | | | |
|---|---|---|---|
| 4,247,018 A * | 1/1981 | Credle | 222/1 |
| 4,738,219 A | 4/1988 | Fujisawa | |
| 5,261,254 A * | 11/1993 | Cattane | 62/271 |
| 5,327,613 A * | 7/1994 | Ohtsu | 15/250.02 |
| 5,651,259 A * | 7/1997 | Twyman | 62/93 |
| 5,935,660 A | 8/1999 | Forsythe et al. | |
| 6,068,888 A | 5/2000 | Forsythe et al. | |
| 6,237,627 B1 * | 5/2001 | Boule | 137/571 |
| 7,201,861 B2 * | 4/2007 | Filleul | 264/102 |
| 2003/0000773 A1 | 1/2003 | Engler et al. | |

FOREIGN PATENT DOCUMENTS

| | | |
|---|---|---|
| EP | 1 369 181 | 12/2003 |
| FR | 2566681 | * 6/1984 |
| FR | 2 566 681 | 1/1986 |
| FR | 2 791 910 | 10/2000 |
| GB | 641739 | 8/1950 |
| WO | 01/53741 | 7/2001 |

* cited by examiner

*Primary Examiner* — Dinh Q Nguyen
(74) *Attorney, Agent, or Firm* — Wenderoth, Lind & Ponack, L.L.P.

(57) ABSTRACT

A device for the thermal fogging of a liquid, includes a unit for producing a stream of pressurized hot gas an ejection pipe; a first source of liquid; and a first circuit for injecting a measured flow of liquid into the ejection pipe (5) from the first source of liquid. In addition, the device includes a sensor for detecting a total or partial interruption of the measured flow of liquid injected into the ejection pipe from the first source of liquid; a second source of liquid; and a second circuit for injecting an emergency flow of liquid into the ejection pipe from the second source of liquid when the sensor detects a total or partial interruption of the measured flow of liquid injected into the ejection pipe from the first source of liquid.

11 Claims, 2 Drawing Sheets

DEVICE AND METHOD FOR THE THERMAL FOGGING OF A LIQUID

BACKGROUND OF THE INVENTION

Figure 1:
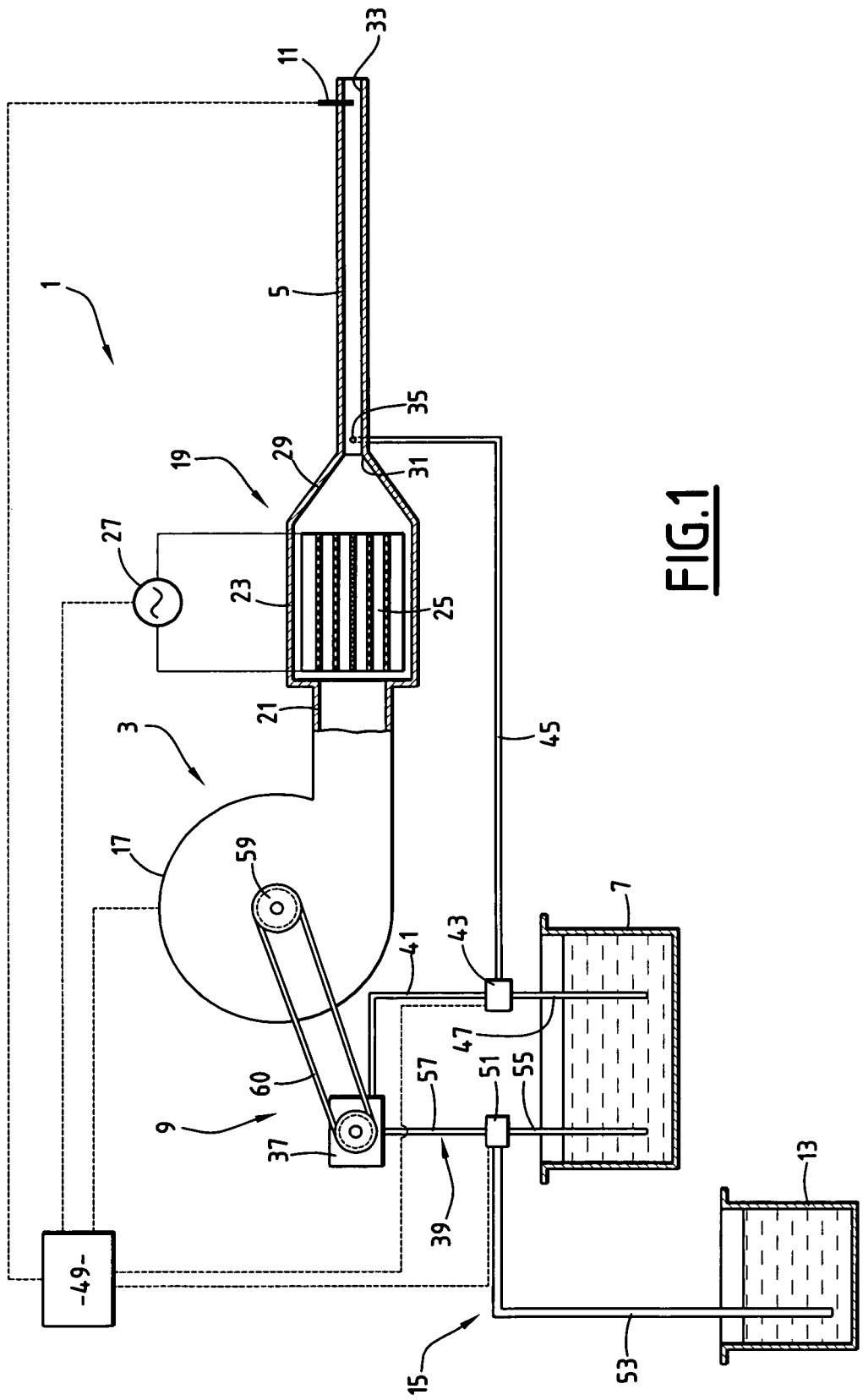

The invention relates in general to the thermal fogging of liquids.

SUMMARY OF THE INVENTION

More precisely, the invention relates, in a first aspect, to a device for the thermal fogging of a liquid, of the type comprising:

- A hot gas production unit for the production of a pressurized hot gas stream, having a hot gas outlet;
- an ejection pipe, having a hot gas inlet connected to the hot gas outlet of the production unit, and an ejection outlet for a mist of liquid;
- a first source of liquid;
- means for injecting a measured flow of liquid into the ejection pipe from the first source of liquid.

Such a device is known from FR 2 566 681, which discloses that the liquid is injected into the ejection pipe by a pump extracting said liquid in a tank. The stream of gas consists of air, heated by an electrical resistor. Fires may occur on this type of thermal fogging machine, particularly when the pump has lost prime. In this context, the invention aims to propose a thermal fogging device in which the fire risk is reduced.

The invention therefore relates to a thermal fogging device of the above-mentioned type, characterised in that it comprises:

- a sensor for detecting an interruption (either total or partial) of the measured flow of liquid injected into the ejection pipe from the first source of liquid;
- a second source of liquid;
- means for providing at the liquid inlet an emergency flow of liquid from the second source of liquid when the sensor detects a total or partial interruption of the measured flow of liquid injected into the ejection pipe from the first source of liquid.

The device may also have one or more of the characteristics below, considered individually or in all the technically possible combinations.

The means for injecting a measured flow of liquid into the ejection pipe from the first source of liquid comprise a liquid measuring device, having a liquid suction inlet connected to the first source of liquid and a liquid delivery outlet connected to a liquid inlet of the ejection pipe. The means for injecting an emergency flow of liquid into the ejection pipe from the second source of liquid can comprise a valve component suitable for selectively connecting the liquid suction inlet of the measuring device to the second source of liquid.

The sensor can be a temperature sensor suitable for measuring the current temperature of the gas in the ejection pipe downstream of the liquid inlet.

The device can comprise a computer suitable for taking the current temperature of the gas measured by the sensor, comparing this current temperature with a predetermined maximum value, and actuating the valve component to connect the liquid suction inlet of the measuring device to the second source of liquid when the current temperature is higher than the predetermined maximum value.

The valve component can comprise a three-way valve comprising a first liquid inlet connected to the first source of liquid, a second liquid inlet connected to the second source of liquid and an outlet connected to the liquid suction inlet of the measuring device.

The first source of liquid can be a source of a liquid containing a chemical treatment agent, and the second source of liquid can be a source of a liquid that does not contain the chemical treatment agent. The second source of liquid can be a source of water.

The unit for producing a stream of pressurised hot gas can comprise a fan, provided with a gas suction inlet and a pressurized gas delivery outlet, and a device for heating the pressurized gas, having a cold gas inlet connected to the delivery outlet of the fan, and an outlet forming the hot gas outlet.

The second source of liquid can be a substantially airtight tank. The means for injecting an emergency flow of liquid into the ejection pipe from the second source of liquid can comprise a pressurising pipe connecting the delivery outlet of the fan to a crown of the second source of liquid, and an injection pipe connecting the second source of liquid to a liquid inlet of the ejection pipe.

According to a second aspect, the invention relates to a method for the thermal fogging of a liquid. This method comprises the following steps:

- creating a current of pressurized hot gas;
- injecting a flow of liquid into the pressurized hot gas from a first source of liquid;
- detecting an interruption (total or partial) of the flow of liquid coming from the first source of liquid; and
- injecting a flow of liquid into the pressurized hot gas from a second source of liquid when a total or partial interruption of the flow of liquid coming from the first source of liquid is detected.

BRIEF DESCRIPTION OF THE DRAWING(S)

Figure 2:
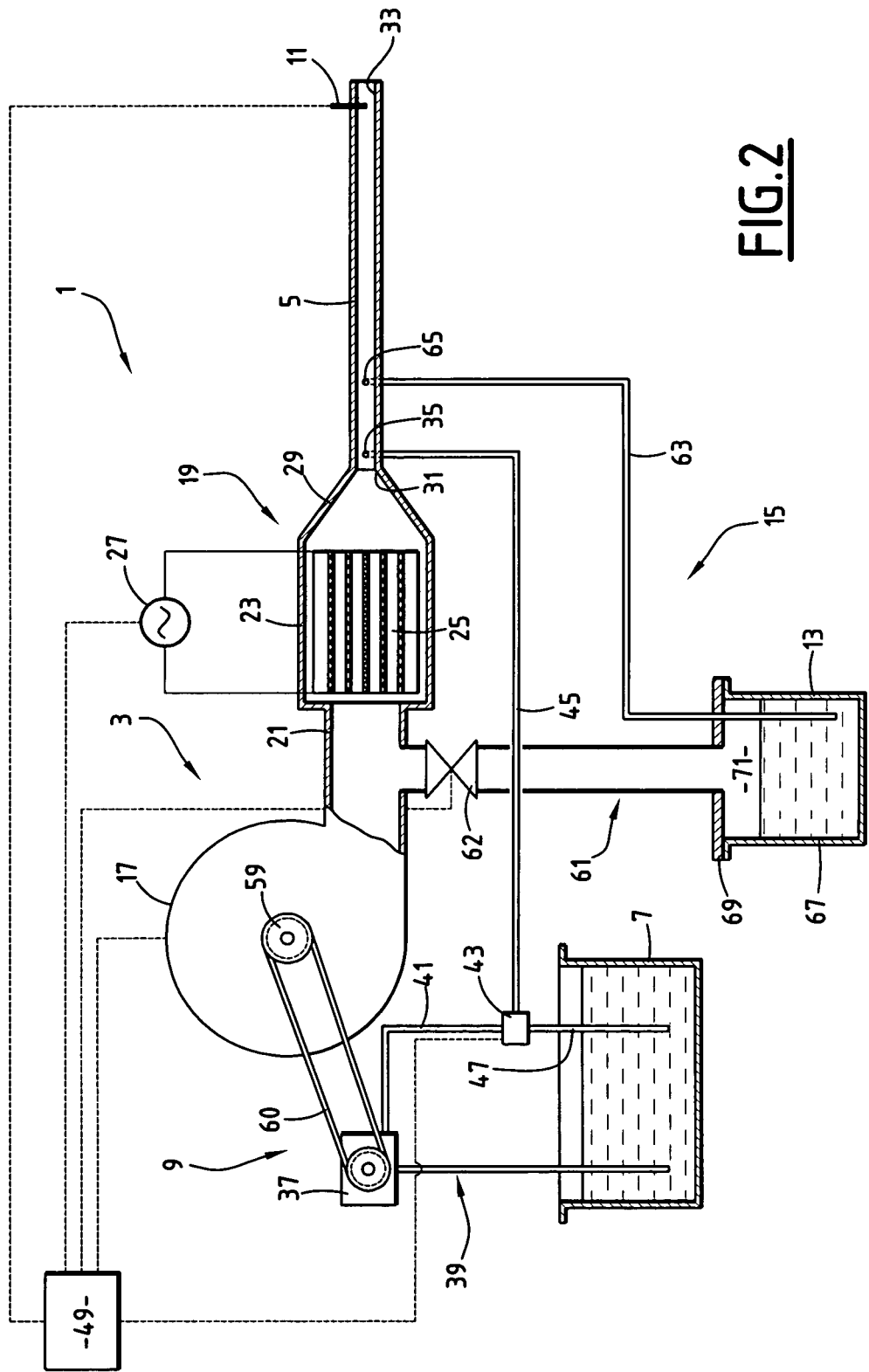

Other characteristics and advantages of the invention will emerge from the description given below as a non-limiting indication, with reference to the accompanying drawings, in which, FIG. 1 is a simplified diagrammatic illustration of a thermal fogging device according to a first embodiment of the invention, FIG. 2 is a similar illustration to that of FIG. 1, for a second embodiment of the invention.

DETAILED DESCRIPTION OF THE PREFERRED EMBODIMENT(S)

The device illustrated in FIG. 1 is a thermal fogging device for producing a stream of gas comprising a mist of liquid. The mist of liquid comprises very fine droplets, at least 90% of the droplets preferably having a diameter less than or equal to 3 microns.

Such a device is typically provided for the treatment of fruit and vegetables stored in enclosed areas, particularly greenhouses or storage areas.

The liquid forming the mist is typically an aqueous solution comprising a chemical agent suitable for the treatment of fruit and vegetables. This chemical agent has, for example, a protective action intended to prolong the conservation of fruit and vegetables. It may have an antioxidant effect, an antigerminative effect and/or a fungicidal effect. Such compositions are described in FR 2 728 142, FR 2 786 664 and FR 2 791 910.

The thermal fogging device 1 comprises: a hot gas production unit 3 for producing a stream of pressurized hot gas; an ejection pipe 5; a first source 7 of a liquid containing a chemical treatment agent; a first injection circuit 9 for supplying a measured flow of liquid to the ejection pipe 5 from the first source 7; a sensor 11 for detecting an interruption (total or partial) of the measured flow of liquid coming from the first source 7 of liquid; a second source 13 of liquid; and a second injection circuit 15 for supplying an emergency flow of liquid to the ejection pipe 5 from the second source 13 of liquid when the sensor 11 detects an interruption (total or partial) of the measured flow of liquid coming from the first source of liquid 7.

The hot gas production unit 3 comprises a fan 17 and a heating device 19. The fan 17 has an inlet for extracting air from the atmosphere (not illustrated) and an outlet 21 for delivering pressurized air.

The heating device 19 comprises an envelope 23, a heating resistor 25 and an electrical supply 27 connected electrically to the electrical resistor 25. The electrical resistor 25 is situated inside the envelope 23. The envelope 23 has a cold gas inlet connected to the delivery outlet 21 of the fan, and a tapered portion 29 defining an outlet 31 for pressurized hot gas.

The ejection pipe 5 is a rectilinear cylindrical pipe. It is open at both ends. One of the ends defines a hot gas inlet connected to the outlet 31 of the heating device. The opposite end defines an ejection outlet for a hot gas stream loaded with a mist of liquid. This outlet has the reference numeral 33. The ejection pipe also comprises a liquid inlet 35 situated near the hot gas inlet.

The first source 7 of liquid is typically a tank filled with treatment liquid. This liquid is typically water containing a chemical treatment agent.

The first injection circuit 9 for supplying a measured flow of liquid to the ejection pipe comprises a volumetric pump 37, a suction pipe 39, a delivery pipe 41, a three-way valve 43 and a connection pipe 45. The suction pipe 39 connects the suction inlet of the pump 37 to the first source tank 7. The delivery pipe 41 connects a delivery outlet of the measuring pump 37 to an inlet of the three-way valve 43. The connection pipe 45 connects a first outlet of the three-way valve 43 to the liquid inlet 35 of the ejection pipe. Furthermore, a return pipe 47 connects a second outlet of the three-way valve 43 to the tank 7.

The temperature sensor 11 is placed in the ejection pipe 5, downstream of the liquid inlet 35. It is placed preferably near the ejection outlet 33. It provides information to a computer 49.

The second source of liquid 13 is, for example, a tank filled with water. This water does not contain a chemical treatment agent.

The second injection circuit 15 for supplying an emergency flow to the liquid inlet from the second source of liquid comprise a three-way valve 51, inserted in the suction pipe 39, and a suction duct 53. A first portion 55 of the suction pipe 39 connects the tank 7 to an inlet of the three-way valve 51. Another portion 57 of the suction pipe connects an outlet of the three-way valve 51 to the suction area of the measuring pump 37. The suction duct 53 connects the second source 13 of liquid to a second inlet of the three-way valve 51.

The shaft 59 of the fan 17 is driven by an electric motor that has not been illustrated. This shaft 59 in turn drives the volumetric pump 37, for example, by means of a belt 60 or directly.

The computer 49 is connected to the temperature sensor 11, to the electric supply 27, to the motor of the fan 17 and to the three-way valves 43 and 51. The computer 49 is suitable for controlling each of these elements.

The fan 17 has a pressure difference between delivery and suction of between $0.20 \cdot 10^5$ Pa and $0.30 \cdot 10^5$ Pa, preferably between $0.22 \cdot 10^5$ Pa and $0.30 \cdot 10^5$ Pa. The output of the fan varies between 30 and 80 Nm$^3$/h, preferably between 55 and 70 Nm$^3$/h. The linear speed of the hot air at the inlet of the pipe 5 is therefore between 160 and 400 m/s, preferably between 200 and 280 m/s. The electrical heating resistor 25 is dimensioned to be capable of heating the air to a temperature of between 550 and 750° C. at the inlet of the pipe 5. Preferably, the electrical resistor 25 is dimensioned to heat the air to a temperature of between 600 and 700° C., and even more preferably between 600 and 650° C. The electrical power of the resistor is between 5 and 20 kW, and preferably has a value of between 7.5 and 10 kW.

At the ejection outlet of the pipe 5, the mist of liquid comprises droplets having a temperature of between 200 and 280° C., driven at a linear speed of between 110 and 140 m/s.

To satisfy these conditions, the following criteria, in addition to the parameters described above, may be suitably adapted:
- the length of the pipe 5;
- the diameter of the pipe 5;
- the output (amount) and temperature of the liquid injected at the inlet 35 of the pipe 5.

The diameter of the pipe 5 is generally between 12 and 25 mm, preferably between 15 and 20 mm, and even more preferably between 16 and 18 mm.

The length of the pipe 5 is generally between 300 and 1500 mm. The injection output of liquid from the first source of liquid 7 at the inlet 35 of the pipe 5 is generally between 5 and 30 liters per hour, preferably between 10 and 25 liters per hour, and even more preferably between 13 and 20 liters per hour. The temperature of the liquid injected into the pipe 5 is generally between 10 and 30° C., preferably between 15 and 25° C., and even more preferably between 20 and 25° C.

In an embodiment, the fan 17 provides a difference in pressure between suction and delivery of 25,000 Pascal, and an output of 60 Nm$^3$/h. The pipe 5 has a diameter of 18 mm and a length of 800 mm. The electrical resistor 25 has an electrical power of 10 kW. The temperature of the hot air at the inlet of the pipe 5 is about 600° C. The linear speed of the hot air at the inlet of the pipe 5 is about 220 m/s. The liquid is injected at the inlet 35 of the pipe 5 at an output of 15 liters per hour, and at a temperature of 20 to 25° C. At the ejection outlet 33 of the pipe, a mist of droplets is obtained which have an average diameter of 0.4 microns. The linear speed of the droplets at the outlet of the pipe 5 is 125 m/s and the temperature of the droplets is about 240° C.

The operation of the above thermal fogging device will now be described.

At start up, the computer 49 actuates the three-way valve 43 to isolate the connection pipe 45 and connect the delivery pipe 41 and the return pipe 47. In addition, the computer 49 actuates the three-way valve 51 to isolate the suction duct 53 and connect the two portions 55 and 57 of the suction pipe 39. The computer 49 activates the start up of the fan 17 and the electrical supply of the resistor 25. The fan 17 extracts atmospheric air and delivers it through the heating device 19 to the pipe 5. The volumetric pump 37 is driven by the shaft 59 of the fan. It extracts the treatment solution in the tank 7 by means of the suction pipe 39 and delivers it back to the tank 7 via the pipes 41 and 47.

When the temperature measured by the sensor 11 exceeds a minimum predetermined value, for example 350° C., the computer 49 actuates the three-way valve 43 to isolate the return pipe 47 and connect the delivery pipe 41 with the connection pipe 45. The treatment liquid extracted by the volumetric pump 37 in the tank 7 is delivered by the pump to the inlet 35. This liquid is then injected into the stream of hot gas at over 600° C. coming from the heating device. The liquid is dispersed in the stream of hot gas and split into very fine droplets. Some of the liquid may be vaporized. Under the effect of the injection of liquid, the stream of gas is cooled, and its temperature falls from about 625° C. to about 240° C.

The computer 49 constantly monitors the temperature of the gas stream loaded with the mist of liquid downstream of the inlet 35, by the sensor 11.

If the flow of liquid coming from the first source 7 of liquid is totally or partially interrupted, the temperature measured by the sensor 11 increases. This interruption may result, for example, from the fact that the tank 7 is empty, all the liquid having already been injected in the pipe 5. This interruption may also result from the fact that the portion 55 of the suction pipe is totally or partially blocked. Because less liquid is injected, or not injected at all into the pipe 5, the stream of gas is no longer cooled in the same way, and the temperature of the stream of gas increases at the sensor 11.

When the computer 49 detects that the temperature measured by the sensor 11 exceeds a maximum predetermined value, for example 400° C., it actuates the three-way valve 51 to isolate the portion 55 and connect the suction duct 53 with the portion 57.

The volumetric pump 37 therefore extracts the water contained in the second source of liquid, namely the tank 13.

The pump 37 delivers the water by the pipes 41 and 45 to the inlet 35 of the ejection pipe. The output of liquid from the second source of liquid 13 is the same as that from the first source of liquid 7. The renewed injection of liquid inside the pipe 5 causes a cooling of the hot gases, which are once more reduced to a temperature of about 240° C.

A second embodiment of the invention will now be described, with reference to FIG. 2. Only the points on which the second embodiment differs from the first will be detailed below.

Elements that are identical, or perform the same function, will be designated by the same reference numerals in both embodiments.

The second injection circuit 15 for supplying an emergency flow of liquid to the ejection pipe from the second source 13 of liquid comprises in the second embodiment a pressurizing pipe 61 of the tank 13, a solenoid valve 62 inserted in the pipe 61, and an injection pipe 63 connecting the tank 13 to a second liquid inlet 65 of the ejection pipe 5.

The pressurizing pipe 61 connects the delivery area of the fan 17 to the crown of the second source tank 13. An upstream end of the pipe 61 is therefore connected to the delivery outlet 21 of the fan. The downstream end of the pipe 61 opens into the crown of the tank 13.

The solenoid valve 62 is an on-off valve, controlled by the computer 49. It can allow or prevent the circulation of air from the delivery area of the fan to the crown of the tank 13.

In this second embodiment, the tank 13 is airtight. It comprises for example a vat 67 open at the top, and a cover 69 for closing the vat 67. Sealing means are arranged between the cover and the vat, to prevent air leaks when the tank 13 is maintained at a pressure at least equal to the delivery pressure of the fan 17. The pipe 61 is attached to the cover 69. For example, the end of the pipe 61 is welded to the cover 69.

An upstream end of the injection pipe 63 passes through the cover 69 and descends into the water contained in the tank 13. A seal is produced between the pipe 63 and the cover 69. This seal is produced for example by welding the pipe 63 on the cover 69. Alternatively, a sealing gasket may be inserted between the pipe 63 and the cover 69. The tank 13 is partially filled with water, the upper portion 71 of the tank, also known as the crown, being normally filled with air. The second liquid inlet 65 of the ejection pipe 5 is situated near the hot gas inlet (in other words, near the first inlet 35).

The operation of the thermal fogging device according to the second embodiment of the invention will now be described.

Start up is similar to that of the device according to the first embodiment of the invention, except that the computer 49 actuates the solenoid valve 62 to close the pressuring pipe 61. The solenoid valve 62 is kept closed during normal operation of the thermal fogging device (in other words, as long as the computer 49 does not detect that the temperature measured by the sensor 11 has exceeded the maximum predetermined value).

However, when the computer 49 detects that the temperature measured by the sensor 11 exceeds the maximum value, it actuates the opening of the solenoid valve 62.

The crown 71 of the tank 13 is then connected with the delivery area of the fan 17. Thus, the contained liquid is put under pressure, since the pressure that then prevails in the crown 71 corresponds to the delivery pressure of the fan 17.

The water contained in the tank 13 is delivered by pressure to the injection pipe 63. This water is injected into the pipe 5 via the second liquid inlet 65.

It should be noted that the air pressure inside the ejection pipe 5 is lower than the air pressure at the delivery outlet 21 of the fan, because of the pressure loss that occurs in the heating device. Thus, the pressure in the crown 71 of the tank 13 is higher than the pressure inside the ejection pipe 5. The section of the injection pipe 63 is dimensioned such that this difference in pressure allows sufficient output of liquid to cool the stream of hot gas entering the pipe 5.

The thermal fogging device described above has many advantages.

Because it comprises a sensor to detect a total or partial interruption of the measured flow of liquid injected into the ejection pipe from the first source of liquid, a second source of liquid, and means for injecting an emergency flow of liquid into the ejection pipe from the second source of liquid when the sensor detects a total or partial interruption of the measured flow of liquid injected into the ejection pipe from the first source of liquid, the fire risks are significantly reduced.

In fact, the second source of liquid takes over from the first source of liquid once there is an interruption of the flow from the first source. Thus, the stream of hot gas passing through the pipe 5 does not remain at a high temperature for long.

It has in fact been seen that the pipe 5 may have solid deposits of chemical treatment agents. These residues have a spontaneous ignition point of about 450° C. If, because of the interruption of the supply of liquid, the stream of hot gas entering the ejection pipe is no longer cooled for a significant period, these residues may catch fire. Because of the invention, the second source of liquid quickly takes over from the first source of liquid, so that the gas stream never reaches the temperature of 450° C., or reaches it only fleetingly and is immediately reduced to a temperature of less than 450° C. once the second source of liquid takes over from the first.

It is particularly advantageous to use a temperature sensor to detect the total or partial interruption of the flow of liquid from the first source, given that the intention is to prevent the rise in temperature of the gas and the spontaneous ignition of the residues.

The second injection circuit for supplying an emergency flow of liquid to the ejection pipe from the second source may be produced particularly economically in the form of a three-way valve inserted in the suction pipe of the volumetric pump, an inlet of which is connected by a suction duct to the second source of liquid. It is therefore not necessary to make provision for a second pump to back up the first.

It is particularly advantageous to provide for the second source of liquid to be a sealed tank and for the means of supplying an emergency flow of liquid to an ejection pipe from the second source to comprise a pressurizing pipe connecting the delivery outlet of the fan to the crown of the sealed tank and an injection pipe connecting the sealed tank to the ejection pipe. Thus, when the interruption of the flow of liquid injected from the first source is due to a failure of the volumetric pump, the second source of liquid may take over despite the pump failure. Similarly, if the interruption results from the loss of prime of the pump, the switch to the second source of liquid is also easier as there is no need to reprime the pump.

The thermal fogging device may have many variants.

The unit for producing a stream of pressurized hot gas does not necessarily consist of a fan coupled to an electrical resistor. The fan may be replaced by a compressor or any other type of device that can supply pressurized gas. The heating device may not be an electrical resistor, but a gas heater, or a heater of any suitable type.

The sensor allowing an interruption of the flow of liquid coming from the first source to be detected may not be a temperature sensor. This device may be a liquid output measurement sensor in the connection pipe 45. The sensor may also be a liquid output sensor in the delivery pipe 41 or in the suction pipe 39 associated with the volumetric pump. To achieve this, it would also be possible to use a sensor for measuring the level of liquid inside the tank 7, associated with means for calculating the output of injected liquid from the variation in level of the tank 7 as a function of time.

The second source of liquid is not necessarily a tank. The second source may be a supply network of drinking water or industrial water, a well, a cistern, or any other source containing a sufficient amount of water. The second source is preferably a source of pure water, but it could also be a source of any other type of liquid as long as this liquid, once sprayed on fruit and vegetables, does not cause problems.

The three-way valve inserted in the suction pipe of the volumetric pump may be replaced by two two-way valves, a two-way valve inserted in the suction pipe of the volumetric pump and a two-way valve inserted in the suction pipe connecting the second source of liquid to the suction pipe.

The second injection circuit for supplying an emergency flow of liquid to the ejection pipe may alternatively comprise an emergency volumetric pump, the suction area of which is connected to the second source of liquid and the delivery area of which is connected to the connection pipe. Alternatively, the emergency pump may be connected to a liquid inlet of the corresponding ejection pipe, which is distinct from the liquid inlet connected to the first source of liquid.

In the second embodiment of the invention, the injection pipe may not be connected to a second liquid inlet of the ejection pipe, but rather to the connection pipe. The injection of liquid from the second source is thus produced by the same liquid inlet as the injection of liquid coming from the first source.

In the second embodiment, the solenoid valve inserted in the pressurizing pipe may be replaced by a solenoid valve inserted in the injection pipe.

What is claimed is:

1. A device for thermal fogging of a liquid, said device comprising:

a hot gas production unit for producing a stream of pressurized hot gas, said hot gas production unit having a hot gas outlet;

an ejection pipe having a hot gas inlet connected to said hot gas outlet of said hot gas production unit, and having an ejection outlet for ejecting a mist of liquid;

a first source of liquid;

a first injection circuit for injecting a measured flow of liquid into said ejection pipe from said first source of liquid, said first injection circuit being arranged between said first source of liquid and said ejection pipe;

a sensor for detecting an interruption of the measured flow of liquid injected into said ejection pipe from said first source of liquid, said sensor being arranged within said ejection pipe;

a second source of liquid;

a second injection circuit for injecting an emergency flow of liquid into said ejection pipe from said second source of liquid when said sensor detects an interruption of the measured flow of liquid injected into said ejection pipe from the first source of liquid, said second injection circuit being arranged between said second source of liquid and said first injection circuit.

2. The device according to claim 1, wherein said first source of liquid is a source of a liquid containing a chemical treatment agent, and said second source of liquid is a source of a liquid not containing any chemical treatment agent.

3. The device according to claim 1, wherein said second source of liquid is a source of water.

4. The device according to claim 1, wherein said hot gas production unit for producing a stream of pressurised hot gas includes:

a fan having a gas suction inlet and a pressurised gas delivery outlet; and a heating device for heating gas under pressure, said heating device having a cold gas inlet connected to said gas delivery outlet of said fan, and said hot gas outlet.

5. The device according to claim 1, wherein said first injection circuit includes a liquid measurement device, said liquid measurement device having a liquid suction inlet connected to said first source of liquid and a liquid delivery outlet connected to a liquid inlet of said ejection pipe; and wherein said second injection circuit includes a valve component configured to selectively connect said liquid suction inlet of said liquid measurement device to said second source of liquid.

6. The device according to claim 5, wherein said sensor is a temperature sensor configured to measure a current temperature of gas in said ejection pipe downstream of said liquid inlet of said ejection pipe.

7. The device according to claim 6, further comprising a computer configured to:

receive a current temperature of the gas in said ejection pipe measured by said sensor;

compare the current temperature with a predetermined maximum temperature; and actuate the valve component of said second injection circuit to connect said liquid suction inlet of said liquid measurement device to said second source of liquid when the current temperature is higher than the predetermined maximum temperature.

8. The device according to claim 6, wherein said valve component of said second injection circuit includes a three-way valve comprising a first liquid inlet connected to said first source of liquid, a second liquid inlet connected to said second source of liquid, and an outlet connected to said liquid suction inlet of said measurement device.

9. The device according to claim 1, wherein said sensor is a temperature sensor configured to measure a current temperature of gas in said ejection pipe downstream of a liquid inlet of said ejection pipe.

10. A device for thermal fogging of a liquid, said device comprising:
- a hot gas production unit for producing a stream of pressurised hot gas, said hot gas production unit having a hot gas outlet;
- an ejection pipe having a hot gas inlet connected to said hot gas outlet of said hot gas production unit, and having an ejection outlet for ejecting a mist of liquid;
- a first source of liquid;
- a first injection circuit for injecting a measured flow of liquid into said ejection pipe from said first source of liquid;
- a sensor for detecting an interruption of the measured flow of liquid injected into said ejection pipe from said first source of liquid;
- a second source of liquid; and
- a second injection circuit for injecting an emergency flow of liquid into said ejection pipe from said second source of liquid when said sensor detects an interruption of the measured flow of liquid injected into said ejection pipe from the first source of liquid;
- wherein said first injection circuit includes a liquid measurement device having a liquid suction inlet connected to said first source of liquid and a liquid delivery outlet connected to a liquid inlet of said ejection pipe;
- wherein said second injection circuit includes a valve component configured to selectively connect said liquid suction inlet of said liquid measurement device to said second source of liquid; and
- wherein said first injection circuit comprises:
    - a volumetric pump having a suction inlet and a delivery outlet;
    - a suction pipe connecting said suction inlet of said volumetric pump to said first source of liquid;
    - a first three-way valve having an inlet, a first outlet, and a second outlet;
    - a delivery pipe connecting said delivery outlet of said volumetric pump to said inlet of said first three-way valve;
    - a connection pipe connecting said first outlet of said first three-way valve to said ejection pipe; and
    - a return pipe connecting said second outlet of said first three-way valve to said first source of liquid.

11. The device according to claim 10, wherein said second injection circuit comprises:
- a second three-way valve inserted in said suction pipe, said second three-way valve having a first inlet, a second inlet, and an outlet; and
- a suction duct;
- wherein said suction pipe has a first portion connecting said first source of liquid to said first inlet of said second three-way valve;
- wherein said suction pipe has a second portion connecting said outlet of said second three-way valve to said suction inlet of said volumetric pump; and
- said suction duct connects said second source of liquid to said second inlet of said second three-way valve.

* * * * *